United States Patent [19]

Kaye

[11] 4,090,479
[45] May 23, 1978

[54] I.C. ENGINE HAVING IMPROVED AIR OR AIR-FUEL INDUCTION SYSTEM

[76] Inventor: Frank Kaye, 16 Niki Court, E. Bentleigh, Australia

[21] Appl. No.: 695,562

[22] Filed: Jun. 14, 1976

[30] Foreign Application Priority Data

Jun. 23, 1975 Australia .............. PC-2075

[51] Int. Cl.² ............ F02B 25/08; F02B 25/10; F02B 23/00; F02B 19/08
[52] U.S. Cl. .......................... 123/30 C; 123/51 B; 123/51 R; 123/51 BA; 123/73 R
[58] Field of Search .............. 123/30 C, 51 B, 51 BA, 123/51, 73

[56] References Cited

U.S. PATENT DOCUMENTS

| | | | |
|---|---|---|---|
| 2,396,429 | 3/1946 | Krygsman | 123/51 B |
| 2,748,757 | 6/1956 | Morris | 123/51 B |
| 3,139,075 | 6/1964 | Tenney | 123/51 BA |
| 3,363,611 | 1/1968 | Von Seggern et al. | 123/73 R |
| 3,411,289 | 11/1968 | Antonsen et al. | 123/51 |
| 3,923,019 | 12/1975 | Yamada | 123/73 R |
| 3,934,562 | 1/1976 | Isaka | 123/73 R |

Primary Examiner—Samuel W. Engle
Assistant Examiner—Thomas H. Webb
Attorney, Agent, or Firm—Shlesinger, Arkwright, Garvey & Dinsmore

[57] ABSTRACT

An internal combustion engine having at least one cylinder in which at least one piston is reciprocable; the air, or air and fuel, induction being by means of an inlet port giving rise to helical flow of air, or air and fuel within the cylinder. In one form, the inlet port is substantially tangential to the cylinder. The cylinder may have a pair of pistons therein movable in unison to adjacent top dead center positions wherein they define with the cylinder wall, an annular combustion chamber.

11 Claims, 5 Drawing Figures

U. S. Patent     May 23, 1978     4,090,479
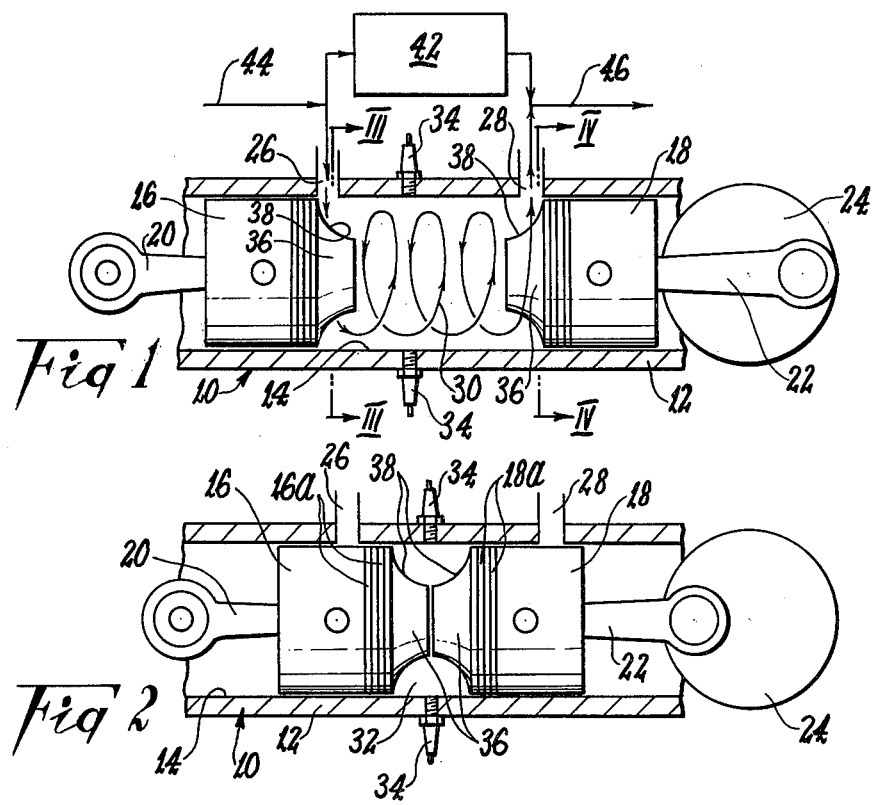
Fig 1
Fig 2
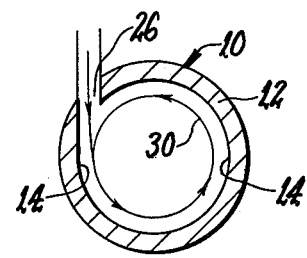
Fig 3
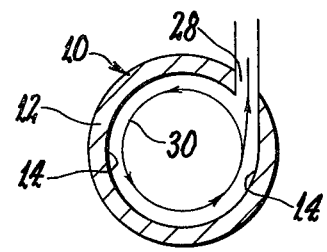
Fig 4
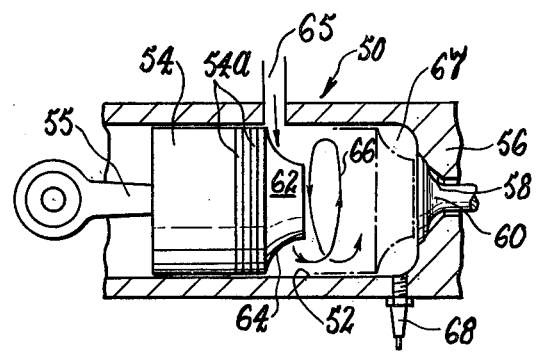
Fig 5

I.C. ENGINE HAVING IMPROVED AIR OR AIR-FUEL INDUCTION SYSTEM

This invention relates to internal combustion engines and, in particular, to an internal combustion engine air or fuel-air induction system and to an engine incorporating such system.

Normally, in internal combustion engines, fuel and air is charged to a combustion chamber through valve ports positioned at the top of the engine cylinders. Other systems are known, for example, those of some two stroke engines, in which the fuel and air is charged, or combustion products are exhausted, through a laterally extending port. However, in each case, the precise positioning of the ports and the resultant flow of the combustion mixture into and within the combustion chamber, although considered critical, has not been as effective as desired. It now has been found that improved fuel combustion can be achieved by providing conditions giving rise to a specific flow pattern for the air or fuel-air, and that such flow can result in more complete combustion and, hence, reduce production of pollutants, as well as increased power and economy due to more complete fuel burning.

According to the present invention, such conditions are provided by an air or fuel-air induction system wherein air or fuel and air are charged to a combustion chamber in a manner giving rise to a helical or circular flow within the combustion chamber. The air and fuel may be charged as a mixture through one or more inlet ports; or separately through at least one air and one fuel inlet port, the fuel charging being, for example, by fuel injection.

Thus, according to the present invention, there is provided an internal combustion engine having at least one cylinder in which a piston is reciprocable; the cylinder having induction port means, exhaust port means and a combustion zone defined by the cylinder and the piston when the latter is at its top dead centre position; the induction port means being spaced from the top dead centre position of the piston and such that charging of at least one of air and fuel-air for combustion in the cylinder is in a manner giving rise to helical, circular flow within the cylinder.

The invention also provides an internal combustion engine having at least one cylinder in which a pair of pistons are oppositely reciprocable and movable in unison to their top dead centre positions where at they define with the cylinder a combustion zone; the combustion zone being intermediate induction port means for the cylinder and exhaust port means for the cylinder; the induction port means being such that induction of at least one of air and fuel-air for combustion to the cylinder is in a manner giving rise to helical, circular flow within the cylinder.

The inlet port means may comprise at least one inlet port which communicates with the cylinder in a manner giving rise to helical or circular flow of the air or air and fuel in the combustion chamber. This may be achieved by the or each inlet port being directed generally tangentially of the cylinder or combustion chamber. Each inlet port also may be inclined slightly with respect to the longitudinal extent of the combustion chamber (i.e., with respect to the direction of piston reciprocation). Additionally, the exhaust port means may comprise at least one exhaust port for the combustion chamber to facilitate expulsion or withdrawal of combustion products with any residual helical or circular flow. Where a single piston is provided in the or each cylinder, a single exhaust port may extend axially of the cylinder and be operable and closable by valve means, such as a poppet valve. Where two pistons are provided in the or each cylinder, the or each exhaust port may be generally tangential with respect to the combustion chamber.

In one form of the engine, the or each cylinder is provided with an opposed pair of pistons movable in unison to top dead centre positions wherein the pair of pistons and their cylinder define a common combustion chamber. The opposed ends of the pistons of the or each pair may be tapered to define therebetween an annular combustion chamber, within which the helical or circular flow is constrained at the moment of firing. In this arrangement, moe than a single spark plug may be used, if reguired, for combustion; for example, a pair of radially spaced, such as substantially diametrically opposed, spark plugs may be used and the plugs also may be longitudinally spaced. The combustion chamber may be located intermediate the inlet port or ports and exhaust port or ports.

In that one form of the invention, the combustion chamber may be substantially centrally disposed with respect to the swept volumes of the pair of pistons and, for example, with respect to the inlet port or ports and outlet port or ports. The arrangement thus may be such that movement of the pistons in unison from their top dead centre postions after firing results in opening of the outlet port(s) and the inlet port(s), after which a charge of fuel and air is admitted between the pistons in a helical or circular flow for the next firing. Such charge also may assist in discharge of combustion products of the preceding firing. As the pistons return to their adjacent top dead centre positions for their next firing, the outlet and then the inlet ports are closed and the mixture compressed for firing between the approaching pistons.

In such an arrangement, the pistons may be substantially completely in unison, so as to substantially simultaneously reach their top dead centre positions. However, it also is envisaged that one of the pistons, or a respective piston on alternate strokes, can be arranged to lead slightly so that the firing occurs with the lead piston at or slightly in advance of its top dead centre position at the time of firing. The latter arrangement enhances the resultant leverage applied to the crankshaft via the conrod of the lead piston, and, hence improves the power output obtainable by holding maximum compression for a period of dwell. In either case, it may be desirable to utilize an opposed pair of spark plugs and firing of these may be slightly staggered to enhance combustion of the fuel and air in the annular combustion chamber defined between the pair of pistons and their cylinder.

Where the or each cylinder is provided with a pair of pistons, the pistons may be of similar form and traverse a similar stroke. Alternatively, one piston may have a shorter stroke. Each piston also may have its conrod connected to and driving a respective crankshaft or, through rocker arms, a common crankshaft. Alternatively, one piston, for example, the piston having a shorter stroke, may be operated by a desmodromic cam; and such piston may be smaller in cross-section and/or length than the other so as to have a lesser mass.

In an alternative arrangement in which the or each cylinder is provided with an opposed pair of pistons movable in unison to top dead centre positions in which the pistons and their cylinder define a common combustion chamber, both pistons have their conrod extending to the one end of the cylinder and connected to the one crankshaft, or the like. In such arrangement, the one piston remote from that end of the cylinder has a rod or tube that extends axially through the other piston in sealing engagement in a central bore thereof for connection to its conrod. A first inlet port to the cylinder may be provided such that fuel and/or air is drawn into the cylinder behind the one piston as it moves to its top dead centre position; there being a conduit for receiving that fuel and/or air when displaced by the one piston on its power stroke and transferring it to the zone between the piston heads for compression therein prior to the next firing. The transferral can be by the conduit terminating at a further inlet adjacent the combustion chamber and which charges the fuel and/or air for helical flow in that chamber. The arrangement can provide super-charging of the fuel and/or air.

In order that the present invention may be more readily understood, reference now will be made to the accompanying drawings, in which:

FIGS. 1 and 2 show the or a cylinder of an engine in longitudinal cross-section, with a pair of pistons thereof respectively at their bottom dead centre and at or adjacent their top dead centre or firing positions, respectively, FIGS. 3 and 4 show transverse sectional views II—II and III—III, respectively, of FIG. 1, and FIG. 5 shows the or a single piston cylinder of an engine in longitudinal cross-section.

In FIG. 1, there may be a single cylinder 10, or a number of such cylinders. In the latter case, further cylinders are represented schematically by the box 42; there conveniently being a common fuel and/or air supply line 44 and a common exhaust line 46 for all cylinders.

An engine incorporating such an arrangement, or that of FIG. 5, may utilize petrol as its fuel. Alternatively, it may be a diesel engine.

The cylinder 10 of FIGS. 1 and 2 has a cylinder wall 12 defining a bore 14 in which a pair of pistons 16 and 18 are reciprocable. Piston 16 may, for example, have a shorter stroke than piston 18 and in either case, may have a conrod 20 for connection to a conventional crankshaft (not shown); while piston 18 has a conrod 22 connected to a crankshaft 24. In an alternative arrangement, piston 16 may be operated by a desmodromic cam rather than by a crankshaft and conrod.

As illustrated in FIG. 1, the pistons 16 and 18 are retracted to their bottom dead centre positions, movement to which result in exhaust port 28 and the inlet port 26 being cleared by piston 18 and piston 16, respectively. Air or fuel-air then is charged via port 26 to the bore 14, such as by a super-charger or crankcase compression, and displaces and/or replaces combustion products of the previous firing via port 28.

As indicated in FIG. 3, the inlet port 26 is located and directed so that the air or air-fuel is charged substantially tangentially into bore 14. Due to this manner of charging and the action of the super-charger or crankcase compression, if used, air or air-fuel is caused to flow in a relatively high velocity path, as shown by arrowed flow line 30.

The combustion products also will be constrained to flow in flow line 30, due to residual helical flow after combustion of the previous fuel and air charge from which it is derived and/or the influence of the helical flow of the next charge of air or fuel-air. As shown in FIG. 4, the port 28 is located and directed so that the combustion products are discharged substantially tangentially from bore 14.

After charging of fuel and air by port 26, the ports 28 and then 26 are closed as the pistons 16 and 18 return to their top dead centre positions. In or adjacent the latter positions, the pistons and the portion of the cylinder wall 12 therebetween define a combustion chamber 32. Opposed pair of spark plugs 34 are mounted in that portion of the cylinder wall and may be fired, either simultaneously or slightly out of phase, to ignite the mixture of fuel and air compressed in chamber 32.

As indicated in FIG. 2, the chamber 32 is annular in cross-section. To achieve this configuration the pistons are provided with tapered crowns 36 defined, in the illustrated arrangement, by concavely curved side wall portions 38. The configuration of the chamber 32 is such that the mixture of fuel and air can flow around the chamber in a helical or circular flow path and, as a result, substantially instantaneous and complete combustion is achieved as the mixture flows past the spark plugs 34.

A motor having such cylinder arrangement is of the two-stroke type but can preferably be used with a super-charger instead of crankcase compression. It has one or more cylinders with opposing pistons the crown of each piston forming the combustion chamber of annular shape. One of the pistons opens and closes the inlet port or ports which is directed to the cylinder at such an angle as to direct the fuel-air mixture to rotate or circulate around the cylinder in a helical or spiral motion, while the other piston controls the opening and closing of the exhaust port or ports which are set at an angle so as to allow the still expanding gases to flow without restriction from the cylinder and thus provide excellent scavenging.

During compression the fuel-air mixture continues to revolve around the compression chamber passing the spark plug or plugs at a high velocity. This velocity plus the very short flame front resulting therefrom, and from the narrow section of the combustion chamber, gives a fast and complete rate of burning.

The piston controlling the exhaust outlet may be advanced in relation to the piston controlling the inlet to give rise to a follow-through and dwell of the pistons in relation to each other at maximum compression and ensure that the maximum pressure is available for the power impulse. This performs the same function as ignition advance, and has all the advantages and none of the disadvantages of ignition advance, while also having the advantage of containing the air in a compact chamber until it is heated to maximum expansion.

While illustrated with reference to an arrangement having a pair of pistons movable in unison toward and away from an intermediately located combustion chamber or zone, the engine in capable of considerable variation within the scope of the present invention. Thus, the invention provides an engine in which the or each cylinder is provided with a single drive piston.

In such an arrangement, the piston may, when in its top dead centre position, co-operate with an end wall of the cylinder to define an annular combustion chamber. The chamber may be of quarter-circular cross-section, such as would be provided by a single piston as shown in FIG. 1. Alternatively, the end wall of the cylinder may be shaped, such as by provision of an annular peripheral recess which provides an end wall of form similar to that provided by the crown of one of the illustrated pistons, so as to define with the piston an annular combustion chamber of semi-circular section.

Such an arrangement is shown in FIG. 5. In that Figure, the cylinder 50 defines a bore 52, along which a single piston 54 is reciprocable. The piston has piston rings 54a, providing a seal around the bore 52, and a conrod 55 for connection to a crankshaft.

The cylinder has an end wall 56 having an aperture 58 therein co-axial with the bore 52. The aperture defined a seat for poppet valve 60 located therein.

The piston has a tapered crown 62 defined by concave peripheral face 64. At the bottom dead centre position illustrated, the piston clears inlet port 65 which extends tangentially of the bore in the manner illustrated in FIG. 3, to give rise to a helical flow 66 of air and/or fuel within the bore. On movement of the piston to its top dead centre position, shown in broken outline, its face 64 defines with the cylinder an annular combustion chamber 67 wherein combustion is effected by spark plug 68. On the resultant power stroke of the piston, valve 60 is moved inwardly of wall 56 to provide an annular opening for discharge of combustion products; such discharge being by a continuation of the helical flow imparted by induction and/or induction of the next charge.

Also in such arrangement, the or each inlet port may be provided with a valve operable in timed relationship with reciprocation of the one drive piston of the or each cylinder to permit charging of air or fuel and air to the cylinder in a helical or circular flow. In one form, the valve may itself be a piston, reciprocable in line with or at an angle to the reciprocation of the drive piston, and such piston valve may, for example, be reciprocable under the action of a desmodromic cam.

Finally, it is to be understood that various alterations, modifications and/or additions may be introduced into the constructions and arrangements of parts previously described without departing from the ambit or spirit of the invention as defined in the appended claims.

Having now described my invention, what I claim as new and desired to secure by Letters Patent is:

1. An internal combustion engine having:
    at least one cylinder in which an induction piston and an exhaust piston are oppositely reciprocable between their top dead center and bottom dead center positions;
    induction port means for the induction to said cylinder of at least one of air and a mixture of air and fuel in a helical, circular flow in said cylinder, and
    an exhaust port means for exhaustion from said cylinder of combustion gases;
    each of said pistons having a tapered crown defined by a circumferential surface and terminating in an end surface extending transversely of said piston, said tapered crown being such that, when said pistons are adjacent their top dead center positions, said end surfaces are closely juxtaposed and said circumferential surfaces define with an intermediate section of the cylinder an annular combustion zone in which said helical circular flow is constrained;
    said induction port means comprising at least one induction port extending substantially tangentially of said cylinder so as to give rise to said helical, circular flow, and being located along said cylinder such that its extent axially of the cylinder is substantially within the axial extent of the induction piston crown, when the latter is in its bottom dead center position, so that the circumferential surface of that crown guides said helical circular flow; and
    said exhaust port means comprising at least one exhaust port extending substantially tangentially of said cylinder, and being located laterally of the crown of said exhaust piston when the latter is in its bottom dead center position so as to receive combustion gases in a continuation of said helical, circular flow;
    there being at least one spark plug for said combustion zone provided in said intermediate cylinder section.

2. An engine according to claim 1, wherein said circumferential surface of each piston crown is concave in side elevation such that said combustion zone, in section, is of substantially semi-circular form.

3. An engine according to claim 1, wherein the pistons are reciprocable substantially simultaneously to reach their top dead center positions.

4. An engine according to claim 1, wherein said exhaust piston leads said induction piston slightly so that firing for combustion of fuel in the combustion zone occurs with said exhaust piston in an over-center position.

5. An engine according to claim 1, wherein a respective piston on alternate strokes leads slightly so that each firing occurs with the respective lead piston in an over-center position.

6. An engine according to claim 1, wherein one piston has a shorter stroke than the other.

7. An engine according to claim 1, wherein each piston has a conrod connected to a crankshaft.

8. An engine according to claim 1, wherein induction to said cylinder is by means of a super-charger incorporated with said engine in communication with said induction port means.

9. An engine according to claim 1, wherein a diametrically opposed pair of spark plugs is disposed within the combustion zone for combustion of an air/fuel mixture therein.

10. An internal combustion engine having:
    at least one cylinder in which an induction piston and an exhaust piston are oppositely reciprocable between their top dead center and bottom dead center positions, each piston having a respective conrod connected to a crankshaft;
    induction port means for the induction to said cylinder of at least one of air and a mixture of air and fuel in a helical, circular flow in said cylinder;
    a super-charger for supplying air to said induction port means; and
    an exhaust port means for exhaustion from said cylinder of combustion gases;
    each of said pistons having a tapered crown defined by a circumferential surface and terminating in an end surface extending transversely of said piston, said tapered crowns being such that, when said pistons are adjacent their top dead center positions, said end surfaces are closely juxtaposed and said circumferential surfaces define with an intermediate section of the cylinder an annular combustion zone in which said helical circular flow is constrained, said intermediate cylinder section being provided with at least one spark plug;
    said induction port means comprising at least one induction port extending substantially tangentially of said cylinder so as to give rise to said helical, circular flow, and being located along said cylinder such that its extent axially of the cylinder is substantially within the axial extent of the induction piston crown, when the latter is in its bottom dead center position, so that the circumferential surface of that crown guides said helical circular flow; and said exhaust port means comprising at least one exhaust port extending substantially tangentially of said cylinder, and being located laterally of the crown of said exhaust piston when the latter is in its bottom dead center position so as to receive combustion gases in a continuation of said helical, circular flow;

there being at least one spark plug for said combustion zone provided in said intermediate cylinder section.

11. An engine according to claim 10, wherein said circumferential surface of each piston crown is concave in side elevation such that said combustion zone, in section, is of substantially semi-circular form.

* * * * *